United States Patent
Gröppel et al.

(10) Patent No.: US 9,424,967 B2
(45) Date of Patent: Aug. 23, 2016

(54) VOLTAGE-LIMITING COMPOSITION

(75) Inventors: Peter Gröppel, Erlangen (DE); Steffen Lang, Hallerndorf (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 0 days.

(21) Appl. No.: 14/235,388

(22) PCT Filed: Jul. 13, 2012

(86) PCT No.: PCT/EP2012/063811
§ 371 (c)(1),
(2), (4) Date: Jan. 27, 2014

(87) PCT Pub. No.: WO2013/014007
PCT Pub. Date: Jan. 31, 2013

(65) Prior Publication Data
US 2014/0145123 A1    May 29, 2014

(30) Foreign Application Priority Data

Jul. 26, 2011  (DE) .......................... 10 2011 079 813

(51) Int. Cl.
*H01C 7/10* (2006.01)
*H01C 7/108* (2006.01)
*C08K 9/02* (2006.01)
(Continued)

(52) U.S. Cl.
CPC .. *H01C 7/10* (2013.01); *C08K 9/02* (2013.01); *H01C 7/108* (2013.01); *H01C 7/112* (2013.01)

(58) Field of Classification Search
CPC .......... H01C 7/108; H01C 7/112; H01C 7/10; C08K 9/02

USPC ..................................................... 252/519.33
See application file for complete search history.

(56) References Cited

U.S. PATENT DOCUMENTS

| 5,611,852 | A | 3/1997 | Pfaff et al. |
| 6,143,405 | A | 11/2000 | Palmgren |
| 6,221,144 | B1 | 4/2001 | Dietz et al. |

(Continued)

FOREIGN PATENT DOCUMENTS

| DE | 102004061585 A1 | 8/2005 |
| DE | 102011079813.7 | 7/2011 |

(Continued)

OTHER PUBLICATIONS

The Engineering Toolbox, Densities of some Common Materials.*
(Continued)

*Primary Examiner* — Mark Kopec
*Assistant Examiner* — Danny N Kang
(74) *Attorney, Agent, or Firm* — Slayden Grubert Beard PLLC

(57) ABSTRACT

A varistor, or voltage-limiting composition has a polymer matrix and a particulate filler containing a partially conductive material applied to an electrically non-conductive carrier material. The carrier material has a lower density than the partially conductive material, so that the settling rate of the filler in the polymer matrix is reduced. The voltage-limiting composition can therefore also be used as a lacquer or for prepreg materials. A body which acts as a varistor may be produced using a composition of this kind by a method that includes annealing. The varistor may be used for surge arresters, in particular in medium-voltage systems, low-voltage systems, cable connections and cable fasteners.

13 Claims, 2 Drawing Sheets

(51) Int. Cl.
*H01C 7/112* (2006.01)
*H01B 3/10* (2006.01)

(56) References Cited

U.S. PATENT DOCUMENTS

| | | |
|---|---|---|
| 6,645,886 B1 | 11/2003 | Muhrer et al. |
| 7,132,922 B2 | 11/2006 | Harris et al. |
| 2008/0030296 A1* | 2/2008 | Jost et al. .................. 338/21 |
| 2008/0152898 A1 | 6/2008 | Donzel et al. |
| 2013/0161062 A1* | 6/2013 | Yamaoka ............... C09D 5/084 174/110 SR |

FOREIGN PATENT DOCUMENTS

| | | |
|---|---|---|
| EP | 0 639 625 A1 | 2/1995 |
| EP | 0 944 097 | 9/1999 |
| EP | 1 585 146 A1 | 10/2005 |
| EP | 1736998 A1 | 12/2006 |
| JP | 2008-544455 | 12/2008 |
| WO | 97/26693 | 7/1997 |
| WO | 99/16841 | 4/1999 |
| WO | WO99/16841 * | 4/1999 |

OTHER PUBLICATIONS

The Engineering Toolbox, Densities of Miscellaneous Solids.*
International Search Report for PCT/EP2012/063811; mailed Nov. 29, 2012.
Office Action in German Application No. 10 2011 079 813.7 dated Jun. 22, 2012.
Partial German Translation of Japanese Office Action dated Mar. 31, 2015 in corresponding Japanese Patent Application No. 2014-522026.
Chinese Office Action dated Dec. 2, 2015 in corresponding Chinese Patent Application No. 201280036826.2 with German Translation and English Translation.

* cited by examiner

VOLTAGE-LIMITING COMPOSITION

CROSS REFERENCE TO RELATED APPLICATIONS

This application is the U.S. national stage of International Application No. PCT/EP2012/063811, filed, Jul. 13, 2012 and claims the benefit thereof. The International Application claims the benefit of German Application No. 10 2011 079 813.7 filed on Jul. 26, 2011, both applications are incorporated by reference herein in their entirety.

BACKGROUND

Described below is a voltage-limiting composition, having a polymer matrix and a particulate filler containing partially conductive material. Also described is a body with such a voltage-limiting composition and a method for producing a voltage-limiting composition. The voltage-limiting composition can be used particularly advantageously for surge arresters with a varistor property, in particular in medium-voltage systems, low-voltage systems, cable connections and cable fasteners.

Non-linear resistors with varistor behavior are used in a wide variety of applications, such as in voltage protection devices, in cable connections, in cable terminations, etc. These non-linear resistors may contain a polymer matrix and a filler embedded in the polymer matrix. The filler contains sintered pellets with predominantly spherical particles of doped metal oxide (metal-oxide varistor (MOV) filler). The particles of the pellets have crystalline composite granular structures. Since a varistor with a polymer matrix/MOV filler composite material can be produced much more easily than a comparably acting varistor on the basis of a sintered ceramic, varistors can be produced with the composite material comparatively easily, inexpensively and in a great variety of forms.

The viscosity of the composite material increases with increasing filler content, until, depending on the matrix material and the type of processing, a practical upper limit is reached, for example of about 50 percent by weight in the case of casting resins. In the case of lacquers and in the case of the production of prepregs, the viscosity of the composite material is lowered by adding solvent until ideal processability is achieved.

On account of the high density of doped metal oxides, of typically more than 5 kg/m$^3$, and the relatively low density of the polymer of the polymer matrix, of about 0.8 to 1.3 kg/m$^3$, the filler quickly settles, as a result of which the maximum degree of filling in the system is restricted, or makes a certain type of processing virtually impossible. For instance, lacquers and prepregs with a low viscosity and partially conductive fillers have not so far been usable in practice.

WO 97/26693 describes such a polymer matrix/MOV filler composite material. Powdered metal oxide pellets, which are produced by sintering a spray-dried MOV powder on the basis of a zinc oxide doped with oxides of Bi, Sb, Mn, Co, Al and/or further metals is used as the filler. These pellets have spherical particles formed like a soccer ball, with varistor behavior. The particles have a diameter of up to 125 micrometers and vary in their size with a Gaussian distribution. This material is used in cable connections and cable terminations, where it forms voltage-controlling layers.

SUMMARY

The voltage-limiting composition described below at least partially overcomes the disadvantages of the related art and is a voltage-limiting composition that can be processed better.

The voltage-limiting composition has a polymer matrix and a particulate filler containing partially conductive material, wherein the partially conductive material is applied to an electrically non-conductive carrier material, and wherein the carrier material has a lower density than the partially conductive material.

The individual particles of the filler, which are therefore made up partially of the less dense carrier material and partially of the more dense partially conductive material, therefore have as a whole a lower average density than the partially conductive material, in particular metal oxide, alone, and consequently settle to a lesser extent within the polymer matrix (improved settling behavior). This allows the composition to be applied more uniformly than before, with a higher filler content. The higher filler content allows much higher current densities to be withstood before the composition degrades. It is also now possible to provide a composition for use as a lacquer and/or with prepregs that keeps a sufficiently distributed high filler content over a sufficiently long time for practical applications.

The polymer matrix may in particular be electrically non-conducting or insulating, in particular after curing or the like.

To provide the electrical partial conductivity (varistor property), the particles of the filler of the voltage-limiting composition may in particular form at least one conduction path leading through the voltage-limiting composition, for which purpose multiple particles come into mechanical and electrical contact, and thus form electrically conductive clusters. With a low content of conductive filler in a non-conductive matrix, such a conduction path usually does not form, and a resistivity of the composition will be almost infinitely high. With an increasing filler content, the resistivity (in the conductive state of the filler) will fall, until, as from what is known as a percolation limit or percolation threshold, it is substantially constant (the composition is then "percolation-saturated"). An increase of the filler content beyond the percolation threshold will therefore no longer produce any significant change in the resistivity and indicates a very strong formation of electrical conduction paths or clusters in the matrix. In the case of the present voltage-limiting composition (which is therefore particularly percolation-saturated, i.e. has a filler content at or beyond the percolation threshold), the percolation threshold may be about 25 percent by weight to about 50 percent by weight of filler. However, the voltage-limiting composition may also have a filler content below the percolation threshold.

It is a development that the partially conductive material is applied to an electrically non-conducting carrier material on all sides. As a result, electrical contacting is ensured when there is mechanical contacting, and formation of an electrical conduction path is supported. Consequently, in this way a percolation threshold can also be kept low.

The conductive material of the filler may in particular include one or more compound semiconductors, in particular doped compound semiconductors.

It is a refinement that the partially conductive material has at least one doped metal oxide. Bi, Sb, Mn, Co, Al and/or other metals, oxides thereof, or else fluorine (F) for example, may be provided in particular as doping. Alternatively or in addition, the partially conductive material may for example have III-IV compound semiconductors, other II-VI compound semiconductors, III-VI compound semiconductors, I-III-VI compound semiconductors, IV-IV compound semiconductors (such as for example SiC), organic semiconductors, etc.

It is also a refinement that the doped metal oxide includes doped tin oxide and/or doped zinc oxide. These metal oxides have a good voltage-limiting or varistor property. Tin oxide and zinc oxide have comparatively high densities of about 6.9 $kg \cdot m^{-3}$ and about 5.6 $kg \cdot m^{-3}$, respectively.

It is also a refinement that the carrier material has a density of less than 3.5 $kg \cdot m^{-3}$, in particular of less than 3.0 $kg \cdot m^{-3}$. Thus, a high difference in density in comparison with the partially conductive material, in particular metal oxides, can be ensured. Such carrier materials include, for example, boron nitride, quartz, silicon carbide, silicon nitride or phyllosilicates.

It is yet a further refinement that the carrier material is a phyllosilicate. Apart from their low density, phyllosilicates, in particular mica, have the advantage that they typically have only a low electrical conductivity.

Mica especially has perfect basal cleavage and also has a particularly low conductivity. Mica also has a particularly low density of about 2.7 $kg \cdot m^{-3}$. The mica may for example be muscovite or biotite. The phyllosilicates in particular, and among them particularly mica, have the further advantage that, as small particles, they have a flat basic form, for example even in the form of powder. A small particle with a partially conductive material applied to a phyllosilicate (in particular on all sides) is consequently not spherical, but rather platelet-shaped. This platelet form further slows down settling, since it opposes movement in the polymer matrix with a higher flow resistance than a spherical particle.

It is yet a further refinement that the carrier material is a ceramic carrier material, for example mica. The ceramic carrier material has the advantage that it is of high mechanical strength and is chemically highly inert and, moreover, can be chosen as an electrical insulator.

It is also a refinement that the particulate filler has been produced by annealing, in particular with the ceramic carrier material. The ceramic carrier material in this case has the advantage that it is highly temperature-resistant and can withstand the annealing undamaged.

It is a development that the particulate material, in particular metal oxide, has been deposited as such or in a preliminary form (for example in a not yet oxidized preliminary form and/or with the addition of additives that are removed during annealing) on the carrier material and then annealed with the carrier material. The carrier material may for example be in the form of a powder. Thus, firmly interconnected particles can be produced, the ceramic carrier material having a temperature resistance that is sufficiently high for annealing. For example, the partially conductive material, in particular doped metal oxide, may have been deposited as such or in the preliminary form on the carrier material, in particular by a wet-chemical process. In particular, for example, tin or zinc or a combination thereof together with Bi, Sb, Mn, Co, Al etc. and possibly with additives may be deposited wet-chemically on mica and be oxidized by the annealing. The additives are thereby annealed out.

It is yet a further refinement that the polymer matrix has an injection-moldable polymer. Thus, a voltage-limiting plastic body, in particular solid body, with a varistor property can be provided in an easy way by the composition.

It is yet another development that the composition is flowable, for example as a result of adding solvent. The composition can thus be used in particular as a lacquer or the like with a varistor property.

It is also a refinement that the polymer matrix has thermosetting and/or thermoplastic material. These polymers can be used particularly well for producing plastic bodies, in particular by an injection-molding process.

The individual particles of the particulate filler may in particular have a predominant width of between 5 micrometers and 70 micrometers with a deviation (d95) from the predominant width of +/−5 micrometers.

A thickness of the particles may in particular lie between 300 nanometers and 600 nanometers. In particular, a thickness of the carrier may lie between 200 nanometers and 300 nanometers. The doped metal oxide may have a thickness of in each case between 100 nanometers and 150 nanometers.

A body that has the voltage-limiting composition as described above has the advantage that it fully or partially has the voltage-limiting composition, which has a higher and/or more uniformly distributed filler content of partially conductive material, in particular of doped metal oxide, than known voltage-limiting compositions. As a result, a more uniform varistor behavior is made possible. Moreover, a body that can withstand much higher current densities before degrading in its function as a varistor is thus provided. This makes possible a varistor body that is particularly durable with respect to current flow and is operationally reliable.

It is a refinement that the body has at least one layer of the voltage-limiting composition. Such a body has in particular the advantage that its basic form, carrying the layer, can be produced using a known process and then at least one layer of or with the voltage-limiting composition can be applied. For the first time, lacquers with the voltage-limiting composition may be used, because the particles settle sufficiently slowly, and so the lacquer with a high and sufficiently uniform filler content can be applied (for example after previous shaking) by known methods (application by brush, spraying on, etc.). In the case of lacquers, filler contents of up to 90 percent by weight can be achieved with the voltage-limiting composition.

It is another refinement that the body has or is a basic body produced from the voltage-limiting composition. The body may in particular only consist of the basic body. Thus, a particularly durable and operationally reliable solid varistor body can also be provided.

It is another refinement that the body has or is a fiber-reinforced composition. In particular, the body may be in the form of a semifinished prepreg or some other semifinished product with a matrix of the composition and fibers for strengthening it. It is therefore possible for the first time by use of the voltage-limiting composition also to provide prepregs etc. with the voltage-limiting competition, in particular with the voltage-limiting composition as the matrix material of the prepreg. In particular, fibers of the prepreg can thus be impregnated with a voltage-limiting composition with a high and sufficiently uniform filler content or be combined therewith. A prepreg may be understood in particular as meaning a continuous fiber-reinforced thermosetting semi-finished product. However, the voltage-limiting composition is not restricted to the use of continuous fibers, but can for example also be used with thermosetting fiber-matrix semi-finished products, such as a BMC (Bulk Molding Compound) or SMC (Sheet Molding Compound), which only have short fibers. The thermosetting material of the prepreg or of another fiber-matrix semifinished product may consequently be a voltage-limiting composition with a thermosetting polymer matrix. For prepregs or other fiber-matrix semifinished products, filler contents of up to 70 percent by weight can be achieved in the voltage-limiting composition. However, the way in which it is formed is not restricted to thermosetting materials.

A method for producing a voltage-limiting composition from a polymer matrix and a particulate filler containing partially conductive material includes annealing to produce the particulate filler with the partially conductive material applied to a lighter, electrically non-conducting, in particular ceramic, carrier material. The method provides the same advantages as the composition described above, and can also be of an analogous form.

The properties, features and advantages of this voltage-limiting composition are described above and the manner in which they are achieved also becomes clearer and more easily understandable in connection with the following schematic description of exemplary embodiments, which are explained more specifically in connection with the drawings. In these, elements that are the same or act in the same way may be provided with the same reference numerals for overall clarity.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
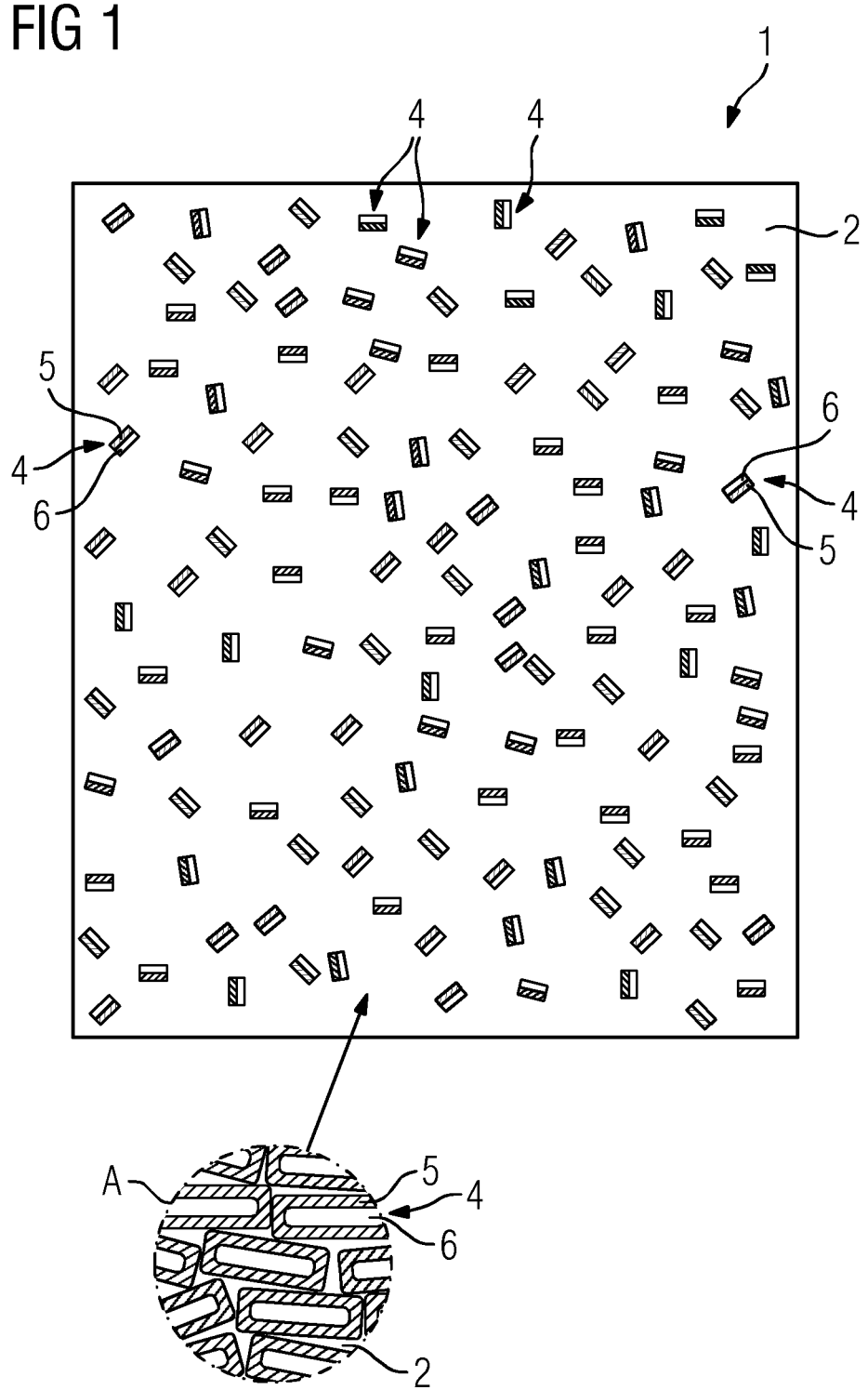
FIG. 1 is a cross-section of a voltage-limiting composition.

FIG. 1 shows a voltage-limiting composition 1. The voltage-limiting composition 1 has an electrically non-conducting polymer matrix 2 with one or more electrically non-conductive thermosetting polymers. The polymer matrix 2 may also have further materials or substances, for example solvents or thinners.

The polymer matrix 2 is mixed with a particulate filler, which has powdered, partially conductive particles 4. This voltage-limiting composition 1 acts as a varistor or has a varistor function or varistor property, meaning that, up to a threshold voltage applied thereto, the voltage-limiting composition 1 is substantially electrically non-conducting and, when the threshold voltage is reached or exceeded, it suddenly becomes substantially conducting. The voltage-limiting composition 1 may therefore be used for example for overvoltage protection.

The particles 4 are in the form of a composite material ("composite particles") such that a partially conductive material in the form of a doped metal oxide 5 rests on a carrier or carrier material 6 of mica, for example muscovite. Here, the doped metal oxide 5 is a tin oxide or zinc oxide doped with an oxide of Bi, Sb, Mn, Co and/or Al. While tin oxide and zinc oxide have a high density of about 6.9 kg·m$^{-3}$ and about 5.6 kg·m$^{-3}$, respectively, mica has a comparatively low density of about 2.7 kg·m$^{-3}$. Mica is also decidedly electrically non-conducting. The particles 4 therefore have an effective average density, which is obtained from a weighted averaging of the densities of the doped metal oxide 5 and the carrier 6 of mica. The particles 4 are consequently lighter than pure doped metal oxide and sink to the bottom considerably more slowly in the polymer matrix 2. The carrier 6 therefore acts as a "float" for the metal oxide.

The sinking of the particles 4 is slowed down still further, or even stopped, by the particles 4 not having a spherical form but a platelet form, on account of the substantially planar carrier 6 of mica. The platelet form increases a flow resistance and thereby reduces the sinking rate. Thus, even in a comparatively liquid polymer matrix 2, the particles 4 can also be distributed sufficiently long to make it possible for the voltage-limiting composition 1 with a sufficiently high filler content to be applied. The voltage-limiting composition 1 can consequently also be used as a lacquer or a resin of a fiber-reinforced plastic.

The particles 4 may in particular have been produced such that tin or zinc doped with Bi, Sb, Mn, Co and/or Al is deposited wet-chemically on powdered mica and then annealed with the mica, the oxides being formed during the annealing. The particles 4 may in particular have a predominant width of between 5 micrometers and 15 micrometers, in particular between 7 micrometers and 9 micrometers. A thickness of the particles 4 may in particular lie between 300 nanometers and 600 nanometers. In particular, a thickness of the carrier or carrier material 6 may lie between 200 nanometers and 300 nanometers and the doped metal oxide 5 may be present on both sides with a thickness of in each case between 100 nanometers and 150 nanometers.

Although the particles 4 are shown not touching one another for the sake of good overall clarity, the voltage-limiting composition 1 is in fact percolation-saturated, as diagrammatically shown on an enlarged scale in detail A. Here the particles 4 are arranged locally such that they are oriented substantially in the same direction, and nearest neighbors of the particles 4 generally touch (cluster formation). As a result, a very reliable form of electrical conduction paths is made possible, and consequently a reliable varistor function. For this purpose, the metal oxide 5 surrounds the carrier 6 in particular on all sides.

Figure 2:
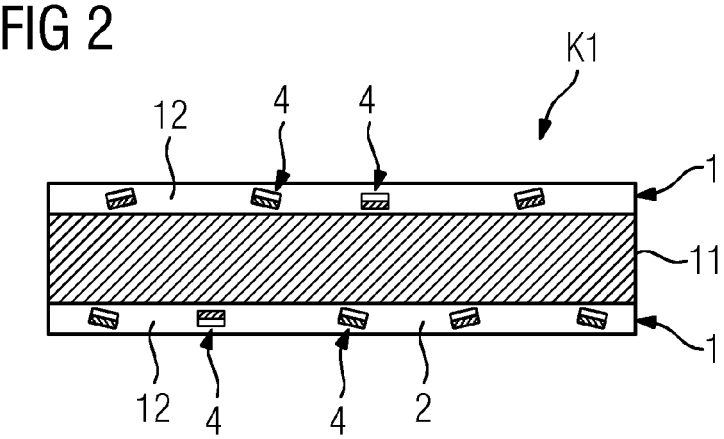
FIG. 2 is a cross-section of a body with a layer of the voltage-limiting composition.

FIG. 2 shows a body K1 with a layer of the voltage-limiting composition 1. The body K1 has a basic body 11 of an electrically non-conducting material (for example plastic or ceramic), the basic body 11 being covered on its surface with a layer 12 of the voltage-limiting composition 1. If a voltage is applied to this body K1, it acts as a non-conductor until the threshold voltage of the doped metal oxide 5 is reached. When the threshold voltage is reached or exceeded, the doped metal oxide 5 conducts. The body K1 consequently acts like a varistor. The voltage-limiting composition 1 may for example have been brushed or sprayed onto the basic body 11 as a lacquer. In this case, a weight content of the filler 4 may be up to about 90 percent by weight.

Figure 3:
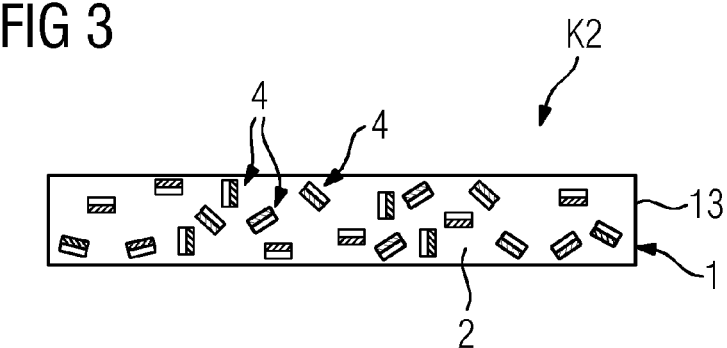
FIG. 3 is a cross-section of a body with a basic body produced from the voltage-limiting composition.

FIG. 3 shows a body K2 with a basic body 13 produced from the voltage-limiting composition 1. Here the basic body 13 therefore acts as a varistor. The voltage-limiting composition 1 may for example have been injection-molded to produce the basic body 13. The polymer matrix 2 or the at least one associated polymer is therefore likewise injection-moldable.

Figure 4:
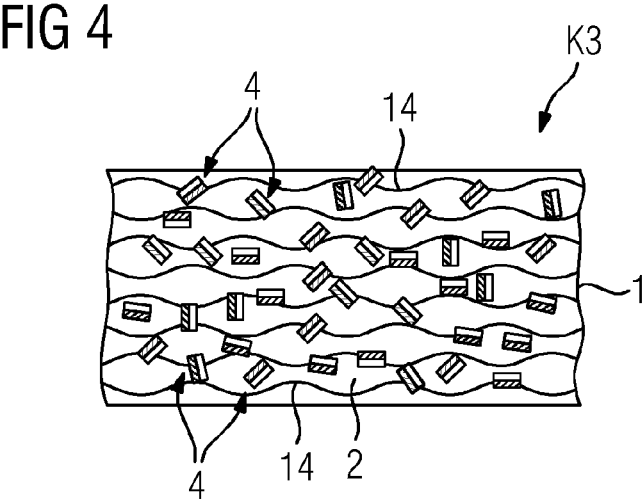
FIG. 4 is a cross-section of a body in the form of a prepreg semifinished product with a fiber-reinforced voltage-limiting composition.

FIG. 4 shows a body in the form of a prepreg layer K3 with a fiber-reinforced voltage-limiting composition 1. The associated continuous fibers 14, impregnated with the voltage-limiting composition 1, may be electrically conducting or electrically non-conducting. Here, the prepreg layer K3 therefore acts as a varistor or basic varistor material. The prepreg layer K3 may have a weight content of the filler 4 of up to about 70 percent by weight. Such a prepreg layer K3 may for example be or have been wound around a basic body.

Although the voltage-limiting composition has been illustrated more specifically and described in detail by the exemplary embodiments shown, the voltage-limiting composition is not restricted to these and other variations can be derived from them by a person skilled in the art without departing from the scope of protection of the invention.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

The invention claimed is:

1. A voltage-limiting composition, comprising:
    a polymer matrix; and
    a particulate filler containing partially conductive material applied to an electrically non-conductive carrier material that has a lower density than the partially conductive material,
    wherein the partially conductive material has at least one doped metal oxide and is comprised of particles having a platelet form.

2. The composition as claimed in claim 1, wherein the doped metal oxide comprises doped tin oxide and/or doped zinc oxide.

3. The composition as claimed in claim 2, wherein the carrier material has a density of less than 3.5 kg·m$^{-3}$.

4. The composition as claimed in claim 3, wherein the carrier material consists of phyllosilicate.

5. The composition as claimed in claim 4, wherein the carrier material is mica.

6. The composition as claimed in claim 5, wherein the carrier material is a ceramic carrier material and the particulate filler has been produced by annealing.

7. The composition as claimed in claim 6, wherein the polymer matrix has an injection-moldable polymer.

8. The composition as claimed in claim 7, wherein the polymer matrix has thermosetting and/or thermoplastic material.

9. A body, comprising:
    a voltage-limiting composition with a polymer matrix and a particulate filler containing partially conductive material applied to an electrically non-conductive carrier material that has a lower density than the partially conductive material,
    wherein the partially conductive material has at least one doped metal oxide and is comprised of particles having a platelet form,
    wherein the body is a surge arrester with a varistor property in at least one of a medium-voltage system, low-voltage system, cable connection and cable fastener.

10. The body as claimed in claim 9, wherein the body has at least one layer of the voltage-limiting composition.

11. The body as claimed in claim 9, wherein the body has a basic body produced from the voltage-limiting composition.

12. The body as claimed in claim 9, wherein the polymer matrix is fiber-reinforced.

13. A method for producing a voltage-limiting composition from a polymer matrix and a particulate filler containing partially conductive material, comprising:
    annealing to produce the particulate filler with the partially conductive material applied to a lighter, electrically non-conducting carrier material,
    wherein the partially conductive material has at least one doped metal oxide and is comprised of particles having a platelet form.

* * * * *